Patented Oct. 20, 1953

2,656,359

UNITED STATES PATENT OFFICE 2,656,359

LAURYL PYRIDINIUM SALTS OF CHLOROPHENOXY-ACETIC ACIDS

Lester A. Brooks, Norwalk, Conn., assignor to R. T. Vanderbilt Company, Inc., New York, N. Y., a corporation of New York No Drawing. Application June 26, 1951, Serial No. 233,689

3 Claims. (Cl. 260—295)

My invention relates to chemical compounds, and more particularly to chemical compounds which possess superior properties when employed as weed killers.

These compounds are the lauryl pyridinium salt of 2,4-dichlorophenoxyacetic acid, a compound having the formula:

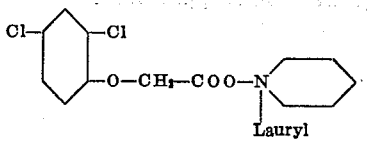

and the lauryl pyridinium salt of 2,4,5-trichlorophenoxyacetic acid, a compound of the formula:

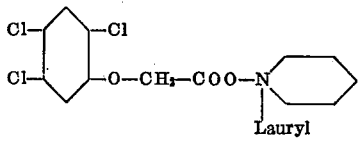

Both of these compounds can be prepared using reaction mechanisms which are essentially conventional. For example, in order to prepare the lauryl pyridinium salt of 2,4-dichlorophenoxyacetic acid the following procedure was employed: 22.1 g. (0.1 mol) of 2,4-dichlorophenoxyacetic acid is dissolved in 250 cc. of water containing 4.0 g. (0.1 mol) of sodium hydroxide. To this is added 28.3 g. (0.1 mol) of lauryl pyridinium chloride and the mixture is heated and stirred until solution is complete. The product is an amber to red colored liquid containing 46.8 grams (0.1 mol) of lauryl pyridinium 2,4-dichlorophenoxyacetate, is soluble in all proportions in water and is useful as such, although the solid lauryl pyridinium salt of 2,4-dichlorophenoxyacetic acid can be obtained therefrom simply by evaporation of the above 20% solution. The solid salt is a plastic, waxy solid which is pale-amber in color.

The lauryl pyridinium salt of 2,4,5-trichlorophenoxyacetic acid can be prepared in essentially the same manner, simply by substituting a chemically equivalent amount of 2,4,5-trichlorophenoxyacetic acid for the 2,4-dichlorophenoxyacetic acid used in the specific illustration.

The lauryl pyridinium chloride employed was a commercially available material prepared from pyridine and a mixture of n-alkyl chlorides in which the alkyl radical is predominately lauryl. The formula is represented by $C_5H_5NC_{12.6}H_{26.2}Cl$ (average). The average molecular weight is 292 and the alkyl pyridinium chloride content (average based on $C_{12}$) is 89%.

Example I

In order to compare the effectiveness as a weed killer of the lauryl pyridinium salt of 2,4-dichlorophenoxyacetic acid with that of the monoethanolamine salt of 2,4-dichlorophenoxyacetic acid, young Coleus plants were sprayed with the aforementioned lauryl pyridinium salt, while other young Coleus plants were sprayed with the aforementioned monoethanolamine salt, the salts being used at concentrations of 500, 1000, 5000 and 20,000 parts per million in water.

The results of these tests are shown in the table below:

| Treatment | Observation and Date Thereof | |
|---|---|---|
| | 1 Day | 6 Days |
| Untreated | No symptoms | No abnormal symptoms. |
| 500 p. p. m. A | do | Do. |
| 500 p. p. m. B | do | Do. |
| 1,000 p. p. m. A | Slight Epinasty | Very severe burning and epinasty. |
| 1,000 p. p. m. B | do | Slight epinasty. |
| 5,000 p. p. m. A | Strong Epinasty | Very severe burning and extreme epinasty. |
| 5,000 p. p. m. B | do | Slight burning and strong epinasty. |
| | 5 Days | |
| 20,000 p. p. m. A | Severe burning and epinasty. | |
| 20,000 p. p. m. B | No burning and mild epinasty. | |

In the above table, the lauryl pyridinium salt is identified by A, and the monoethanolamine salt is identified by B.

Example II

In this experiment, weeds in a planting of ensilage corn which had been poorly controlled by cultivation were treated, since the site appeared to be an excellent one on which to test the possibility of eliminating large weeds from a planting of tall corn. The weeds, which were very thick and as high as two feet tall in some places, consisted mostly of ragweed, redroot, and lamb's quarters, as well as some foxtail and nutgrass. The corn was six to eight feet tall over most of the area at the time the weeds were sprayed.

The spray was applied using a self-propelled wheelbarrow type sprayer, the boom having a center nozzle which sprayed downward in the usual manner. A nozzle was positioned on each end of the boom with the fan pattern turned slightly upward and outward. No shields were used to protect the corn plants.

In carrying out the spraying operation, two gallons of the aqueous solution of the lauryl pyridinium salt of 2,4-dichlorophenoxyacetic acid, prepared as described above and admixed with 100 gallons of water, were applied per acre.

Upon inspecting the site both one month and two months later, it was found that a very effective degree of weed control had been obtained, with only slight damage to the corn.

The compounds of the present invention can be employed as weed killers in essentially the same manner as other derivatives of 2,4-dichlorophenoxyacetic acid and other derivatives of 2,4,5-trichlorophenoxyacetic acid have heretofore been used. For example, the salt can be incorporated into an aqueous solution at a suitable concentration and the solution then sprayed upon freshly cultivated and planted soil. Application in this manner will prevent the germination of weed seeds in the upper layer of soil, thereby permitting a clean growth of crop.

I claim:
1. The compounds of the generic formula

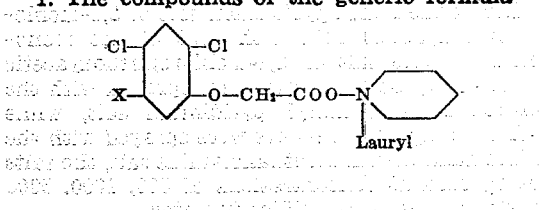

in which X is selected from the group consisting of hydrogen and chlorine.

2. The compound of the formula

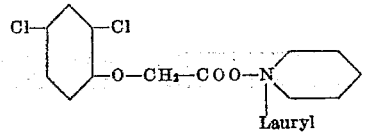

3. The compound of the formula

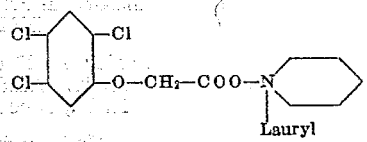

LESTER A. BROOKS.

References Cited in the file of this patent

UNITED STATES PATENTS

| Number | Name | Date |
|---|---|---|
| 2,396,513 | Jones | Mar. 12, 1946 |

OTHER REFERENCES

Mattiello: "Protective and Decorative Coatings," (1944), vol. IV, pp. 309, 352.